Jan. 1, 1957  J. W. PETRE  2,775,961
FUEL SUPPLY SYSTEM
Filed Oct. 22, 1954
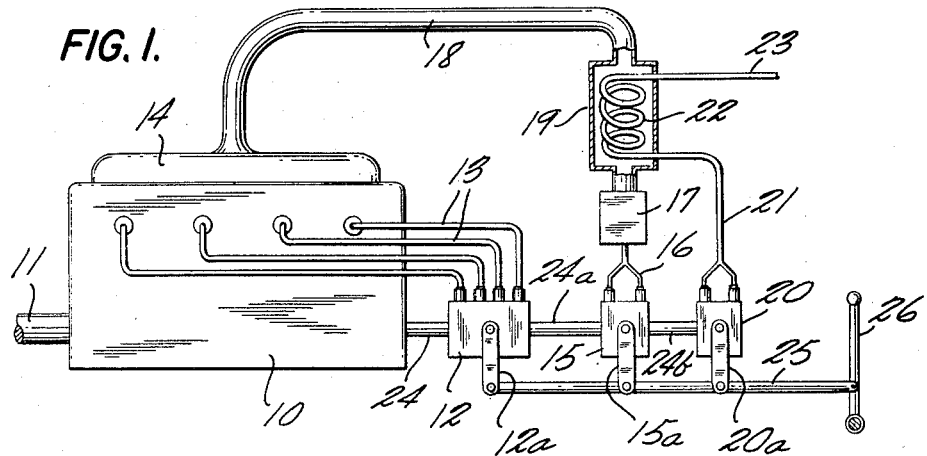
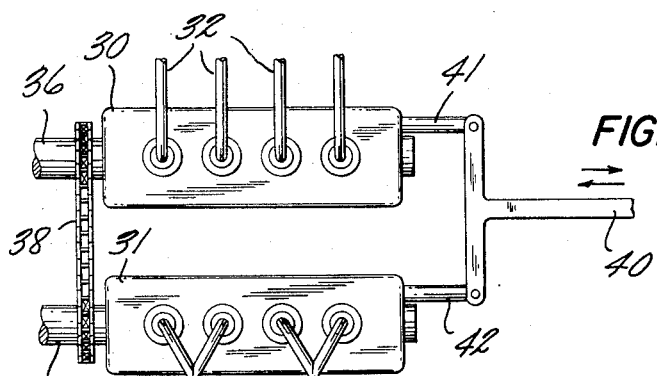
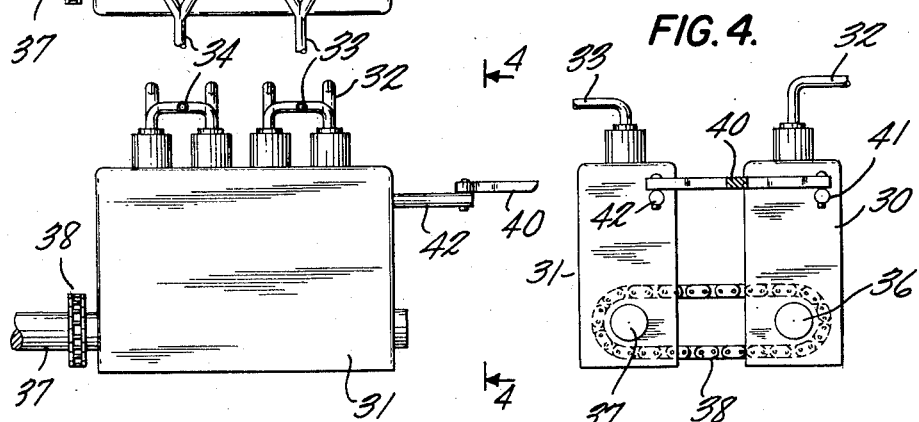
INVENTOR.
John William Petre
BY
Campbell, Brumbaugh, Free & Graves
his ATTORNEYS

United States Patent Office 2,775,961
Patented Jan. 1, 1957

2,775,961
FUEL SUPPLY SYSTEM

John William Petre, Huntington, N. Y., assignor to Fairchild Engine and Airplane Corporation, Hagerstown, Md., a corporation of Maryland Application October 22, 1954, Serial No. 463,885

6 Claims. (Cl. 123—119)

This invention relates to power plants intended for operation in regions where oxygen from the atmosphere is not available, or at least not available in sufficient quantity to support combustion. More particularly, the present invention relates to means for supplying an oxidant, such as hydrogen peroxide, to a decomposition chamber in fixed ratio to the supply of fuel, whereby oxygen may be manufactured and supplied to the engine in sufficient quantities to support combustion.

Although oxidants have been heretofore employed to supply the necessary oxygen to support combustion for diesel engines adapted for underwater operation and for operation in regions where oxygen from the atmosphere is scarce, difficulties have been encountered due to the extremely high temperatures of the decomposed oxidants. For example, the temperature of decomposed hydrogen peroxide is excessively high and generally unsatisfactory for use in internal combustion engines intended for long-time operation because of the overheating effect, unless the engine is specially designed to withstand such temperatures.

The present invention overcomes this difficulty by providing a system wherein the oxygen released by the decomposition is cooled before being introduced into the manifold of the internal combustion engine.

In addition, in the system of the present invention, the supply of fuel, oxidant, and the cooling medium for the decomposed oxidant are all metered by a common control means. In this manner the flow of the fuel, oxidant and the cooling medium will be regulated by a single control means to insure that the fuel, oxidant and cooling medium will be supplied in proper ratio for all operation conditions of the internal combustion machine.

The invention will be more fully understood by reference to the detailed description which follows and to the accompanying drawing in which:

Fig. 1 is an illustrative view of an internal combustion engine and the control system of the present invention;

Fig. 2 is a top plan view of a modified form of control system;

Fig. 3 is a side elevation of the system shown in Fig. 2; and

Fig. 4 is a view taken on the line 4—4 of Fig. 3, looking in the direction of the arrows.

Referring to Fig. 1 of the drawing, an internal combustion engine 10 of the diesel type is provided with a main power take-off shaft 11. Fuel is supplied to the combustion chambers of an internal combustion engine by a fuel injector pump 12 via the conduits 13.

In accordance with the present invention, hydrogen peroxide or other suitable oxidant is adapted to be supplied from a reservoir (not shown) by the injector pump 15 through conduits 16 to a decomposition chamber 17 containing a catalyst wherein the hydrogen peroxide is decomposed to release oxygen. The catalyst may be one of several usually employed, such as ceramic pellets or stones impregnated with metallic oxides. The effect of the catalyst is to decompose the peroxide rapidly and thoroughly, thereby releasing oxygen. The manufactured oxygen is delivered to the manifold 14 of the internal combustion engine through a conduit 18 after first passing through a cooling chamber 19.

The products formed by the decomposition of the hydrogen peroxide supply the necessary oxygen for the operation of the internal combustion engine, however, the temperature of these products is too high to be employed in internal combustion engines. The temperature of decomposition varies with the concentration or strength of the peroxide used. The adiabatic temperature of decomposition of 100% hydrogen peroxide at atmospheric pressure is about 1824° F. Commercially available concentrations of hydrogen peroxide result in decomposition temperatures of approximately 1300° F. to 1400° F. These temperatures are excessive when peroxide is to be used as the oxidant in engines of the standard diesel or spark-ignition typs. It is desirable that the products of decomposition be cooled to a temperature range of approximately 200° F. to 300° F. before they enter the intake manifold of the engine. A constant inlet temperature of the oxygen is deemed a most desirable feature. It is adapted to be cooled by means of the cooling chamber 19 in heat-exchanging relationship with the conduit 18 before the oxygen is introduced into the manifold of the engine. A coolant for this purpose is circulated by the injector pump 20 which causes the cooling medium to flow from a source of supply (not shown), via a conduit 21 to the coils 22 within the cooling chamber 19, and ultimately through the discharge conduit 23. If water is used as the cooling medium, it is desirable to meter it by the pump 20 in such quantities that it is converted into steam to thereby take advantage of the latent heat of vaporization which will be absorbed by the water.

It is desirable that the supply of fuel, hydrogen peroxide and the cooling medium be all metered by common control means in order to maintain the proper ratio therebetween necessary for continuous operation. Accordingly, the pumps 12, 15 and 20 may be all driven by power taken from the engine 10 by means of the driven shafts 24, 24a and 24b, and the rates of delivery from the pumps 12, 15 and 20 metered by means of the pivoted, valve control levers 12a, 15a and 20a, respectively. The free ends of these pivoted levers are connected to a common link 25 which may be actuated by means of the hand lever 26. The levers 12a, 15a and 20a may control the output from each of the respective pumps 12, 15 and 20 by regulating, in any suitable manner, the discharge valves of the pumps.

In operation the internal combustion engine is provided with a predetermined supply of fuel by the pump 12. In order to provide the necessary oxygen for the combustion of the fuel, a predetermined quantity of hydrogen peroxide must be delivered by the pump 15, and in order to sufficiently cool the quantity of oxygen supplied to the engine, a predetermined quantity of the cooling medium must be circulated by the pump 20. Thus, as the fuel requirements for the engine vary, it is desirable to also vary the quantity of hydrogen peroxide delivered to the decomposition chamber and the quantity of cooling medium circulated, and this, of course, is possible by the provision of the single lever control 26, which may be actuated by hand or automatic control means.

A modified form of the invention is shown in Figs. 2 to 4 wherein two four-chamber injector pumps 30 and 31 are arranged side by side. The pump 30 serves as the fuel pump and supplies fuel by way of the conduits 32 to the engine. The pump 31 serves to supply both the hydrogen peroxide and the cooling fluid, two of the chambers of the pump 31 serving to supply the hydrogen peroxide by way of the conduit 33 and the other two chambers serving to supply the cooling medium by way of the conduit 34.

In this arrangement of the pump 30 is driven by the drive shaft 36 and the power for rotating the drive shaft 37 of the pump 31 is taken off from the shaft 36 by means of a sprocket transmission 38.

The pumps 30 and 31 are similar in operation to the pumps 12, 15 and 20 described in connection with Fig. 1, and the conduit 33 supplies the hydrogen peroxide to the decomposition chamber 17 whereas the conduit 34 supplies the cooling medium to the cooling chamber 19, all in the manner described in connection with Fig. 1.

In lieu of the manually controlled lever 26 of the embodiment of the invention described in connection with Fig. 1, the pumps 30, 31 may be controlled simultaneously by a single yoke 40 pivotally connected to a slide member 41 associated with the pump 30 and a slide member 42 associated with the pump 31. The slide members 41, 42 regulate discharge valves, thereby controlling the output of the respective pumps. Thus, as the link 40 is shifted in one direction, the output of the pumps 30 and 31 would be simultaneously increased in predetermined relation, and as the link is shifted in the opposite direction, the output would be diminished in predetermined relation.

The invention has been shown in preferred forms only and by way of example and obviously many variations and modifications may be made therein without departing from the spirit of the invention. For example, instead of regulating the output of the pumps supplying fuel, the oxidant and the cooling medium, the speed of operation of the pumps can be regulated in predetermined relationship to achieve the same effect. It is to be understood, therefore, that the invention is not to be limited to any specified form or embodiment, except insofar as such limitations are set forth in the appended claims.

I claim:

1. In a system for supplying fuel and oxygen in predetermined proportions to an engine intended for operation in regions where an adequate supply of oxygen necessary to support combustion is not available in sufficient quantity from the atmosphere, means for supplying fuel to the engine, a chamber wherein an oxidant is decomposed to produce oxygen to support combustion, means for supplying an oxidant to the decomposition chamber, a conduit for supplying oxygen from the decomposition chamber to the engine, means for supplying a coolant in heat-exchanging relationship with the conduit to reduce the temperature of the oxygen supplied to the engine, and means for regulating simultaneously and in fixed proportion the supply of fuel to the engine, the supply of the oxidant to the decomposition chamber, and the flow of coolant to the engine.

2. In a system for supplying fuel and oxygen to an engine, a fuel pump for supplying fuel to the engine, a chamber containing a catalyst for manufacturing oxygen by the decomposition of an oxidant, a pump for delivering an oxidant to said chamber, a conduit for supplying oxygen from the chamber to the manifold of the engine, a heat exchanger, and a pump for supplying a coolant to the heat exchanger, whereby the temperature of the oxygen supplied to the manifold of the engine will be reduced.

3. A system as set forth in claim 2 including means to regulate the output of the fuel pump, means for regulating the output of the pump for delivering the oxidant, means for regulating the output of the pump supplying the coolant, and a single actuating means common to all of said pumps for regulating the supply of fuel, oxidant and coolant in predetermined proportions.

4. A system as set forth in claim 2 wherein the power for driving the three pumps is supplied from the engine.

5. In a system for supplying fuel and oxygen to an engine, a fuel pump, a pump for supplying oxygen produced from an oxidant to the engine, a pump for supplying a coolant to reduce the temperature of the oxygen supplied to the engine, and control means common to all of said pumps for controlling the output thereof in predetermined proportions.

6. In a system for supplying fuel and oxygen in predetermined proportions to an engine intended for operation in regions where an adequate supply of oxygen necessary to support combustion is not available in sufficient quantity from the atmosphere, a chamber containing a catalyst for manufacturing oxygen by the decomposition of an oxidant, a fuel pump for supplying fuel to the engine, a pump for supplying an oxidant to the said decomposition chamber, a pump for supplying a coolant to reduce the temperature of the oxygen supplied to the engine, slidable valve controlling means for regulating the output of the pump supplying the fuel, slidable valve controlling means for regulating the output of the pumps supplying the oxidant and the coolant, and actuating means common to both of said slidable valve control means.

References Cited in the file of this patent

UNITED STATES PATENTS

| | | |
|---|---|---|
| 1,108,608 | Nedoma | Aug. 25, 1914 |
| 1,154,609 | Bruniquel | Sept. 28, 1915 |
| 1,262,034 | Frazer | Apr. 9, 1918 |
| 1,876,879 | Drabold | Sept. 13, 1932 |